United States Patent
Siegrist

[19]

[11] Patent Number: 5,918,934
[45] Date of Patent: Jul. 6, 1999

[54] CHILD SEAT ATTACHMENT SYSTEM

[75] Inventor: Ronald R. Siegrist, Grass Lake, Mich.

[73] Assignee: Johnson Controls Technology Company, Plymouth, Mich.

[21] Appl. No.: 09/189,163

[22] Filed: Nov. 9, 1998

[51] Int. Cl.$^6$ ...................................................... B60N 2/28
[52] U.S. Cl. .................................. 297/250.1; 297/216.11; 297/253; 296/64
[58] Field of Search ................................. 297/254, 250.1, 297/216.11, 253; 296/64

[56] References Cited

U.S. PATENT DOCUMENTS

| | | | |
|---|---|---|---|
| 5,383,708 | 1/1995 | Nagasaka et al. | 297/250.1 |
| 5,466,044 | 11/1995 | Bailey et al. | 297/250.1 X |
| 5,468,014 | 11/1995 | Gimbel et al. | 297/216.11 X |
| 5,536,066 | 7/1996 | Sedlacek | 297/250.1 |
| 5,669,663 | 9/1997 | Feuerherdt | 297/250.1 X |

FOREIGN PATENT DOCUMENTS

| | | |
|---|---|---|
| 0552570A2 | 7/1993 | European Pat. Off. . |
| 0619202B1 | 10/1994 | European Pat. Off. . |
| 0694436A1 | 1/1996 | European Pat. Off. . |
| 0703113A2 | 3/1996 | European Pat. Off. . |
| 29604073 | 6/1996 | Germany . |
| 1595954 | 11/1977 | United Kingdom . |
| 2260695 | 4/1993 | United Kingdom . |
| 2277018 | 10/1994 | United Kingdom . |
| 2302274 | 1/1997 | United Kingdom . |

*Primary Examiner*—Peter R. Brown
*Attorney, Agent, or Firm*—Harness, Dickey & Pierce, P.L.C.

[57] ABSTRACT

A child seat attachment system for a vehicle seat having a seat cushion and a seat back extending upwardly from the rear end of the seat cushion. The child seat attachment system includes a cross-bar extending laterally of the seat where at least one end of the cross-bar can be coupled to the mounting mechanism for attaching either or both of the seat cushion and seat back to the vehicle. The cross-bar has a child safety seat anchorage portion projecting through the bight line of the seat between the seat cushion and seat back for attachment of the child safety seat thereto. In a preferred embodiment, the cross-bar is rotatable about a lateral axis to enable the cross-bar to move downward against the seat cushion when the seat is occupied by an adult seat occupant to improve the comfort for the adult seat occupant.

25 Claims, 6 Drawing Sheets

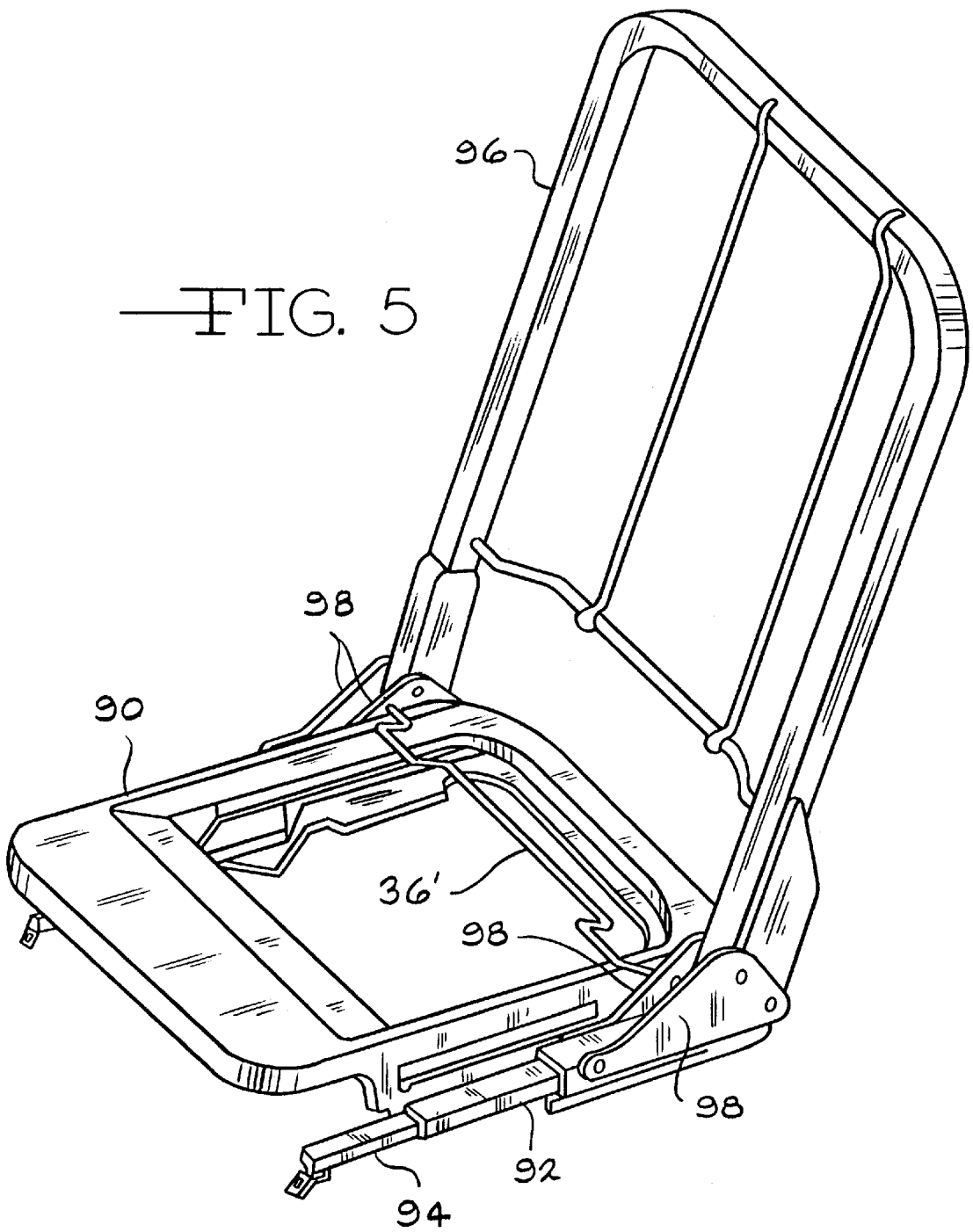

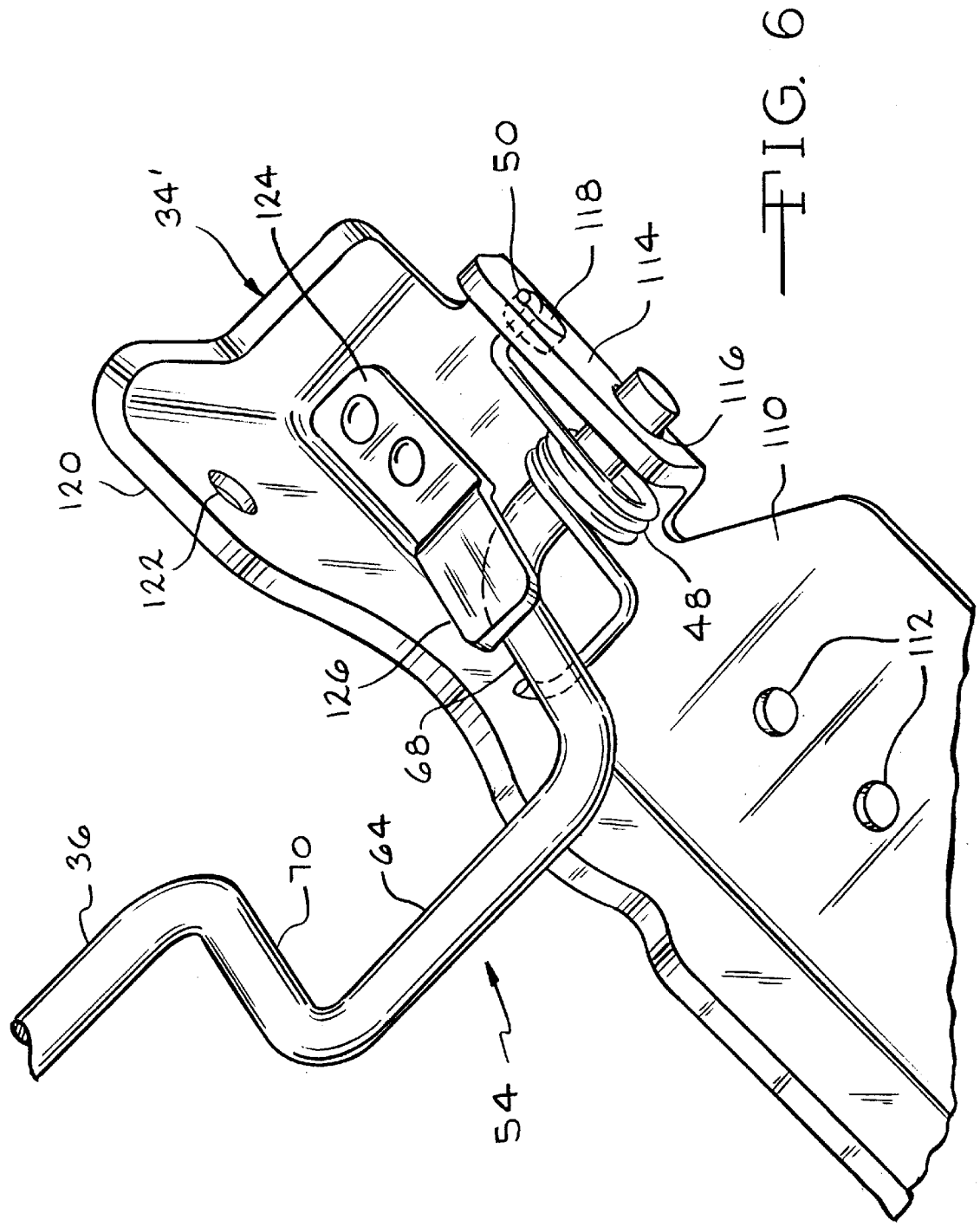

CHILD SEAT ATTACHMENT SYSTEM

BACKGROUND OF THE INVENTION

1. Technical Field

This invention generally relates to a child seat attachment system for a motor vehicle and, more particularly, to an attachment system providing lower attachment points for a child safety seat.

2. Discussion

Safety considerations, and in some areas, legislation, require that small children traveling in a vehicle be restrained by equipment specifically designed for this purpose. The restraint systems normally provided in vehicles for improving the safety of adults traveling in the vehicle are generally not suitable for occupants below a certain weight or height. The apparatus most commonly used for restraining children, who do not fit the height or weight requirements of the provided restraint system, is a child safety seat or car seat as they are often referred to. The child safety seat is generally secured to the vehicle by utilizing the seat belts of the adult restraint system.

Several international and federal legislative bodies have proposed providing attachment methods for the child safety seat which are easier to use than the typical attachment by way of the seat belts. The United Nations Economic Commission for Europe has drafted such a proposal entitled "Universal Child Restraint Anchorage System", which is generally known as "ISOFIX". The proposed child restraint attachment system uses two lower fixed anchorages in conjunction with a top tether. The lower anchorages are intended to be located in the seat bight line (i.e. the region of intersection of the surfaces of the seat cushion and the seat back). Such lower anchorages are intended to be used with tether hooks, small push-button buckles, or specifically designed ISOFIX connectors.

The present invention is intended to provide an attachment system having the lower anchorages for an ISOFIX connection which are incorporated as part of the seat back assembly and, which can be deflected to a stored position when the seat back is lowered to a fold flat position, or when an adult occupant is seated in the seating position for improved adult occupant comfort.

SUMMARY OF THE INVENTION

In accordance with the teachings of the present invention, there is provided an attachment system generally including a seat back assembly, and an anchorage cross-bar. The anchorage cross-bar of the present invention is pivotally connected to a seat back assembly at each end, and provides anchorage attachment portions along its length. The seat back assembly of the preferred embodiment provides a lower pivot bracket attached to the floor of the vehicle and an upper pivot bracket pivotally attached to the lower pivot bracket and coupled to a seat back frame. The pivotal connection between the upper and lower pivot brackets allows the seat back to pivot forward, thereby providing access to the storage compartment or area to the rear of the seat. Alternately, the lower pivot bracket can be attached to a structural component which is in turn connected to the floor of the vehicle. Such a structural component may include a seat cushion frame which is then connected to the floor or a seat track mechanism which is in communication with the floor.

By attaching the cross-bar to the seat back lower pivot bracket or to the track or seat cushion frame, during vehicle assembly, the cross-bar is mounted to the vehicle body with the seat. There are few, if any, additional final assembly operations required to install the cross-bar. There may be one additional bracket needed to attach the cross-bar to the vehicle body. The cross-bar is pivotally mounted so that the cross-bar can rotate to a stored position when the seat is occupied by an adult to prevent compromise of the adult seat comfort by the provision of the cross-bar anchorage attachment portions extending from the seat bight line.

BRIEF DESCRIPTION OF THE DRAWINGS

The various advantages of the present invention will become apparent to one skilled in the art upon reading the following specification and by reference to the drawings which include:

FIG. 1A is an enlarged view of the portion in FIG. 1 in the circle 1A;

FIG. 5 is a perspective view of a vehicle bucket seat frame with the attachment of the present invention incorporated therein and mounted to the seat cushion frame; and FIG. 6 is a perspective view of an alternative embodiment of the lower pivot bracket used with the present invention.

DETAILED DESCRIPTION OF THE PREFERRED EMBODIMENT

The following description of the preferred embodiment is merely exemplary in nature and is in no way intended to limit the invention, or it's application, or uses.

Figure 1:
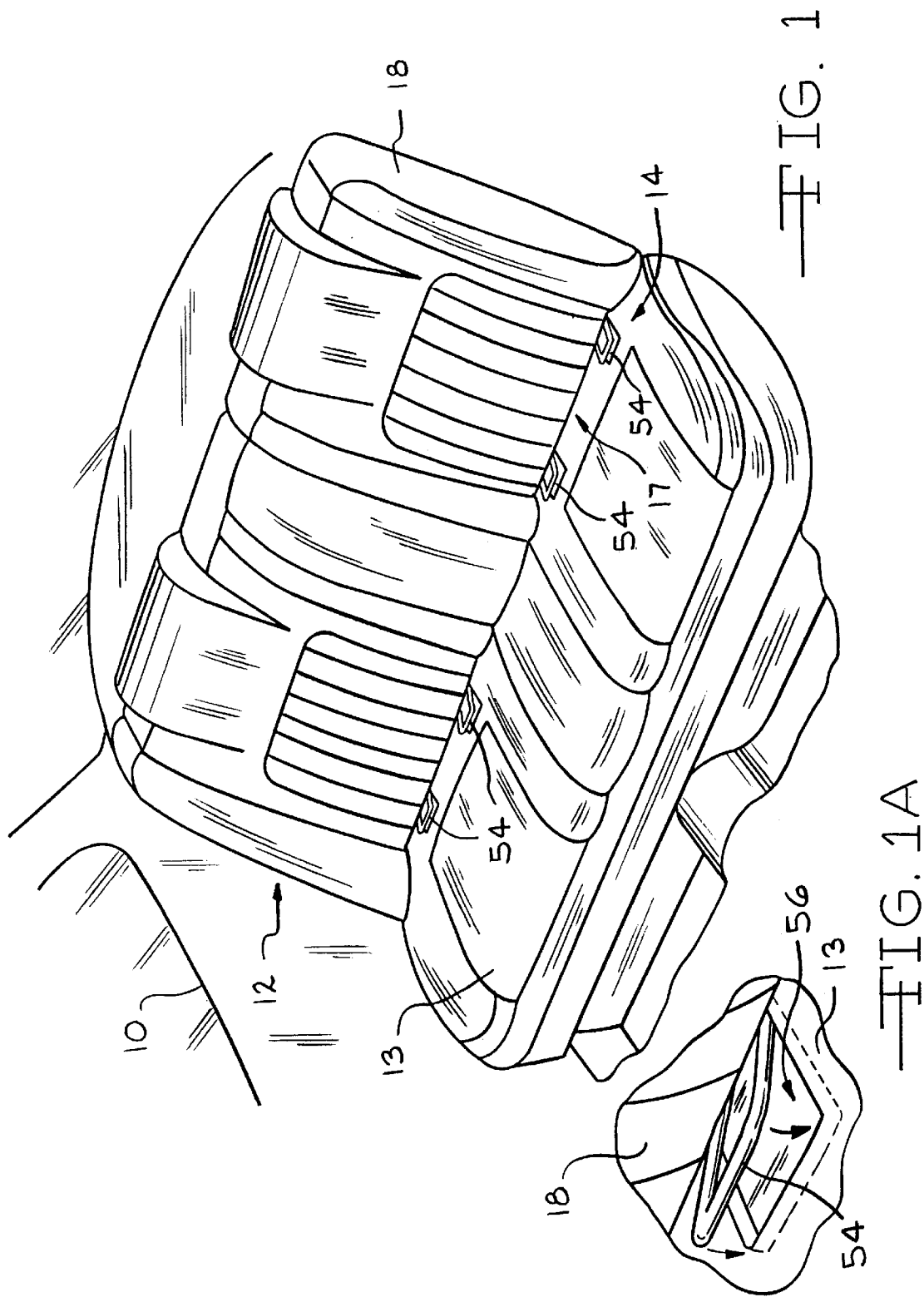
FIG. 1 is a partial perspective view of a vehicle incorporating an attachment system made in accordance with the teachings of the present invention.

Referring to FIG. 1, a vehicle 10 is shown with a seat 12. The seat 12 is intended to provide one or more seating positions for occupants of the vehicle 10. The seat 12 includes an attachment system 14 made in accordance with the teachings of the present invention. While the attachment system 14 will be described in the present embodiment as being incorporated as part of a vehicle rear seat, it is within the scope of the present invention to incorporate the attachment system 14 in any of the seating positions of the vehicle (excluding the driver seat) and, in any type of vehicle in which child safety seats may be utilized. These vehicles include, but are not limited to, automobiles, trains, planes, buses, and heavy or light duty trucks.

The seat 12 includes a generally horizontal seat cushion 13 and a seat back 18 extending generally upwardly at the rear of the seat cushion. The intersection of the seat cushion 13 and seat back 18 is generally referred to as a bight or bight line 17. The attachment system 14 provides a plurality of anchorage attachment portions 54 which project from the bight line 17 and to which a child safety seat (not shown) can be attached.

Figure 2:
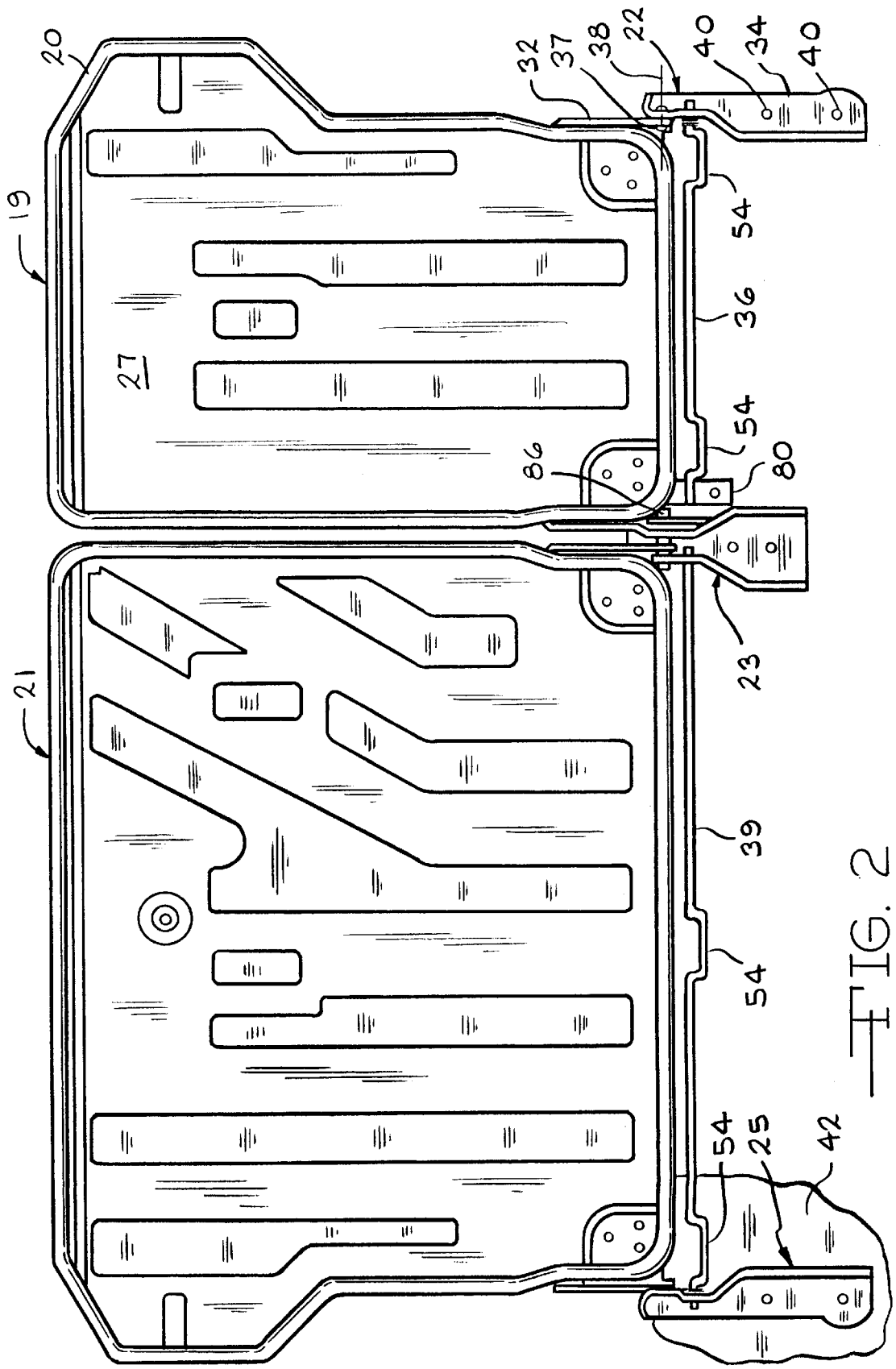
FIG. 2 is a front view of a seat incorporating the attachment system of the present invention, the seat is shown without the trim and foam for clarity.

FIG. 2 shows a portion of seat 12 in which the trim and foam have been removed for clarity. As shown, seat back 18 is a split back, having two portions 19, 21 mounted to the body of vehicle 10 by mounting mechanisms 22, 23, 25. The seat back portion 19 includes a frame 20 about the perimeter of the seat back portion 19 and a pan 27 within the frame 20. The frame is attached to the mounting mechanisms 22, 23 for attachment of the seat back portion 19 to the body of the vehicle 10. The seat back portion 21 is similarly constructed and is attached to the body of the vehicle by mounting mechanisms 23, 25. While the seat back portions are shown as being made of a metal perimeter frame and a pan, any type of seat back structure can be used and any materials, including metal and plastic or a combination of metal and plastic.

Seat back mounting mechanism 22 of the preferred embodiment includes an upper pivot bracket 32 and a lower pivot bracket 34. Upper pivot bracket 32 and lower pivot bracket 34 are pivotally attached to one another by a seat back pivot 37 for rotation about an axis 38. Upper pivot bracket 32 is connected to the frame 20 by fasteners 33. Lower pivot bracket 34 of the present invention provides attachment apertures 40 through which fasteners are secured to the floor 42 of vehicle 10 to mount the lower pivot bracket 34, and thus the seat back portion 19, to the floor 42. It will be appreciated by the reader that while the seat back mounting mechanism 22 is described in detail, the other mounting mechanisms 23, 25 will also have an upper pivot bracket and lower pivot bracket symmetrically opposite or similar to those shown as brackets 32 and 34 of the mounting mechanism 22. Further, it is within the scope of the present invention to provide a seat back mounting mechanism which incorporates the attachment of an adult restraint member to the floor 42 of vehicle 10 as well.

Figure 3:
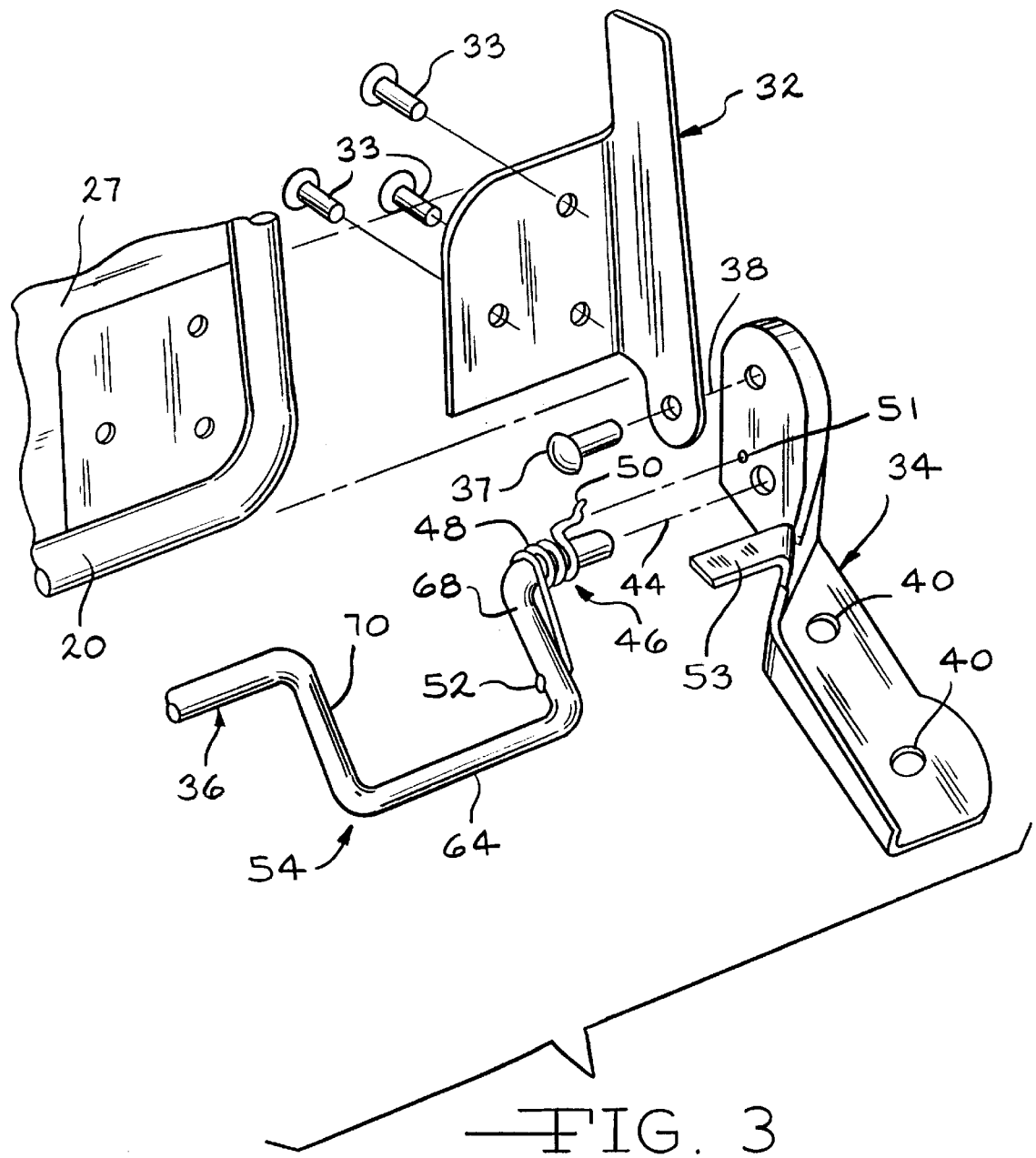
FIG. 3 is a detailed exploded perspective view of a portion of the attachment system shown in FIG. 2.

An anchorage cross-bar 36 is pivotally attached to the lower pivot bracket 34 and pivots about anchorage cross-bar pivot axis 44 (FIG. 3). A bias member 46 can be incorporated at one or both ends of anchorage cross-bar 36. Bias member 46 of the preferred embodiment is a torsional spring member 48 generally circumscribing an end portion of anchorage cross-bar 36 and having a first free end 50 secured to lower pivot bracket 34 by insertion into an aperture 51 in the lower pivot bracket 34. The second free end 52 of torsional spring member 48 is in contact with a portion of anchorage cross-bar 36 and biases cross-bar 36 against an upper stop 53 to an in-use position wherein anchorage attachment portions 54 are exposed between the bight line 17 of seat cushion 13 and seat back 18 as shown in FIG. 1. Two laterally spaced anchorage attachment portions 54 are used to mount a child safety seat.

In the preferred embodiment, anchorage cross-bar 36 is approximately 6 mm in diameter and anchorage attachment portions 54 provide an attachment segment 64 which is at least 25 mm long. The center-to-center spacing between the attachment segments 64, in the preferred embodiment, is approximately 280 mm. Positioning segments 68 and 70 of anchorage attachment portions 54 are made of a length to properly locate attachment segment 64 when anchorage cross bar 36 is in the in-use position.

The preferred embodiment of the present invention shows positioning segments 68 and 70 to be substantially equal in length, however, it is within the scope of the present invention to provide dissimilar lengths between segment 68 and 70, including segment 70 having a length equal to zero. In such an embodiment, attachment anchorage portions 54 would effectively be connected by a continuous straight segment therebetween. Further, at times it may be beneficial to provide a positioning segment 70 which is greater in length than positioning segments 68 to provide clearance to other members extending with the bight line 17, or to improve comfort when an adult occupant is seated in the seating position incorporating attachment system 14 of the present invention.

In operation, anchorage cross-bar 36 is biased to the in-use position wherein anchorage attachment portions 54 are exposed through bight line 17 and are visible to an operator installing a child safety seat (not shown). Attachment portions 54 will be exposed at all times with the exception of when an occupant, not requiring a child safety seat, is seated in the seating position, or when the seat back 18 is rotated forward to provide access or improved storage within the vehicle. Under either of the above conditions, the force applied to anchorage attachment portions 54 either by the seat back 18 or by the occupant located in the seating position, causes anchorage cross-bar 36 to rotate about pivot axis 44 and overcome the upward bias exerted by torsional spring member 48. Upon overcoming the torsional bias, anchorage attachment portions 54 rotate downwardly toward seat cushion 13 and are moved to a stored position. Depressions or cut-outs 56 (FIGS. 1 and 1A) may be provided in seat cushion 13 to accept the downwardly pivoted anchorage attachment portions 54 or, the portions 54 can deform the generally compliant foam and trim which is typically utilized on the seat cushion. The upward biasing force exerted by torsional spring member 48 of the preferred embodiment is intended to be sufficient to rotate anchorage cross-bar 36 to a position where anchorage attachment portions 54 are consistently located in a visible and desirable location, while at the same time allowing the bar 36 to be rotated to the stored position without undue pressure being exerted on the adult occupant or the seat back cushion.

The seat back mounting mechanisms 22, 23, 25 are hinge mechanisms which allow the seat back portions to rotate forward onto the seat cushion 13. The attachment system of the present invention can be incorporated into a seat with fixed, non-rotating seat backs. In such a case, the cross-bar 36 is mounted to a seat back mounting bracket to which the seat back frame is fixed. The mounting bracket is in turn fixed to the vehicle floor.

Figure 4:
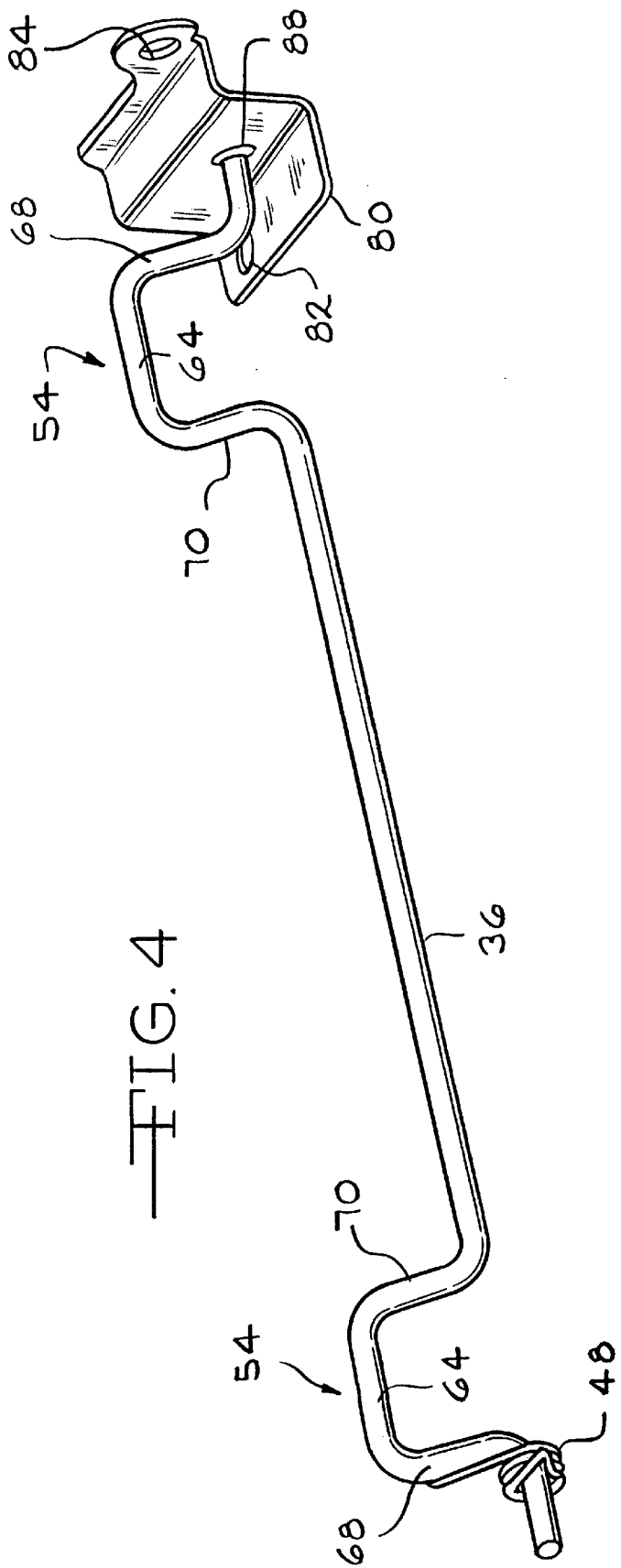
FIG. 4 is a rear perspective view of the attachment system shown in FIG. 3.

With reference to FIGS. 2 and 4, a separate bracket 80 is used to mount the end of the cross-bar 36 opposite the seat back mounting mechanism 22. The bracket 80 is positioned adjacent the mounting mechanism 23. Bracket 80 includes an aperture 82 for a fastener to attach the bracket to the floor 42 of the vehicle. The bracket 80 further includes an aperture 84 for attaching the bracket 80 to the pivot 86 of the mounting mechanism 23. The cross-bar 36 is coupled to the bracket 80 through an aperture 88. The separate bracket 80 is used to provide clearance between the cross-bar 36 and the cross-bar 39 extending across the seat back portion 21 for seat belt anchorages at the mounting mechanism 23. Depending on the configuration of the mounting mechanism 23, the cross-bar 36 could be attached to the lower pivot bracket of the mounting mechanism 23 and eliminate the need for a separate bracket 80.

An alternative embodiment of the pivot bracket is shown in FIG. 6 and designated as 34'. The pivot bracket 34' has a mounting portion 110 with apertures 112 through which fasteners are inserted to mount the bracket to the body of the vehicle. Bracket 34' includes a first upstanding flange 114 having a pair of apertures 116, 118. An end of the cross-bar 36 is inserted into the aperture 116. The aperture 118 receives the end 50 of the torsional spring 48.

The pivot bracket 34' includes a second upstanding flange 120 that includes an aperture 122 which receives the seat back pivot 37 for attachment of the upper pivot bracket 32 to the lower pivot bracket 34'. A stop tab 124 is secured to the lower pivot bracket 34'. The stop tab 124 includes a raised portion 126 which engages the positioning segment 68 of the cross-bar 36 in the in-use position of the cross-bar 36.

Further provided within the scope of the present invention is the incorporation of locking mechanisms which would secure anchorage cross-bar 36 in a stored position for those vehicles in which child safety seats are seldom or never utilized, and the owner of such vehicle finds the aesthetic appearance or slight pressure exerted on an occupant by anchorage attachment portions 54 to be objectionable.

Further, it is within the scope of the present invention to provide an attachment system in which an anchorage cross-bar 36' is attached to a seat cushion frame as shown in FIG. 5. Such a configuration is common in front passenger seats, or among second and third row seats utilized in MPV's, SWV's or seats utilized in buses. The seat cushion frame 90 is attached to a slide rail 92 which moves fore and aft upon a fixed rail 94 attached to the vehicle floor. The seat back frame 96 is pivotally mounted to risers 98 fixed to the slide rail 92. The anchorage cross-bar 36' is pivotally mounted to the risers 98 in the same manner as described above with the mounting of the cross-bar 36 to the lower pivot bracket 34.

Further still, a variable recline mechanism can be incorporated between the lower pivot bracket 34 and the upper pivot bracket 32 such that the seat back angle can be varied relative to the seat cushion. Such recline mechanisms are well known in the industry and can include, but are not limited to, continuous engagement, pawl and sector, and dump seat mechanisms. The definitions of which terms are known in the industry. Dump slide type recliner and seat track systems can also be provided in conjunction with the attachment system 14 of the present invention.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

I claim:

1. In a vehicle seat having a seat cushion with an upper seating surface, a seat back with a forward facing seating surface extending upwardly from a rear end of the seat cushion, the seat cushion seating surface and the seat back seating surface intersecting at a bight line, and a mounting mechanism for attaching one of the seat cushion and seat back to a vehicle body, a child safety seat attachment system comprising a cross-bar having two ends and extending laterally of the seat with at least one of the two ends of the cross-bar being coupled to the mounting mechanism, the cross-bar having a child safety seat anchorage attachment portion projecting through the bight line between the seat back and the seat cushion above the seat cushion seating surface for attachment to a child safety seat to mount the child safety seat in the vehicle.

2. The child safety seat attachment system as defined in claim 1 wherein the mounting mechanism attaches the seat back to the vehicle and the mounting mechanism is a hinge having a lower pivot bracket adapted to be fixed to the vehicle and an upper pivot bracket rotatably mounted to the lower pivot bracket about a pivot with the seat back coupled to the upper pivot bracket for rotation with the upper pivot bracket about said pivot, the cross-bar being mounted to the lower pivot bracket whereby the child safety seat loads are transmitted from the cross-bar to the lower pivot bracket and from there to the vehicle body.

3. The child safety seat attachment system as defined in claim 2 wherein the cross-bar is rotatably mounted to the lower pivot bracket to rotate about a lateral axis whereby the anchorage attachment portion of the cross-bar is movable downward onto the seat cushion seating surface.

4. The child safety seat attachment system as defined in claim 3 further comprising a bias mechanism operatively associated with the cross-bar and the lower pivot bracket to urge the cross-bar upward to a position in which the anchorage attachment portion of the cross-bar is above the seat cushion seating surface.

5. The child safety seat attachment system as defined in claim 4 further comprising an upper stop against which said cross-bar is urged by said bias mechanism.

6. The child safety seat attachment system as defined in claim 1 wherein the cross-bar is rotatably mounted to the mounting mechanism to rotate about a lateral axis whereby the anchorage attachment portion of the cross-bar is movable downward onto the seat cushion seating surface.

7. The child safety seat attachment system as defined in claim 6 further comprising a bias mechanism operatively associated with the cross-bar and the mounting mechanism to urge the cross-bar upward to a position in which the anchorage attachment portion of the cross-bar is above the seat cushion seating surface.

8. In a vehicle having a seat, the seat including a seat cushion with an upper seating surface, a seat back with a forward facing seating surface extending upwardly from a rear end of the seat cushion, the seat cushion seating surface and the seat back seating surface intersecting at a bight line, a child safety seat attachment system comprising a cross-bar having two ends and extending laterally of the seat, the cross-bar having a child safety seat anchorage attachment portion projecting through the bight line between the seat back and the seat cushion above the seat cushion seating surface for attachment to a child safety seat, and a pair of mounts for attaching the cross-bar to the vehicle with one mount of the pair of mounts at each of the ends of the cross-bar to attach the cross-bar to the vehicle, the mounts attaching the cross-bar for rotation about a lateral axis whereby the cross-bar can move from a use position in which the anchorage attachment portion extends above the seat cushion for attachment of a child safety seat thereto to a stored position in which the anchorage attachment portion engages the seating surface of the seat cushion.

9. The child safety seat attachment system as defined in claim 8 further comprising a bias mechanism operatively associated with the cross-bar and one of the mounts to urge the cross-bar upward to the use position.

10. The child safety seat attachment system as defined in claim 9 wherein the bias mechanism includes a torsional spring coupled to the cross-bar and the mount at one end of the cross-bar.

11. The child safety seat attachment system as defined in claim 8 wherein the one of the seat cushion and the seat back is fixed to at least one of the pair of mounts to attach the one of the seat cushion and seat back to the vehicle.

12. The child safety seat attachment system as defined in claim 8 wherein the one seat back is fixed to at least one of the pair of mounts to attach the seat back to the vehicle.

13. The child safety seat attachment system as defined in claim 12 wherein the at least one mount has a lower pivot bracket fixed to the vehicle and an upper pivot bracket rotatably coupled to the lower pivot bracket about a pivot and the seat back is fixed to the upper pivot bracket for rotation with the upper pivot bracket about said pivot and said cross-bar is coupled to the lower pivot bracket whereby the child safety seat loads are transmitted from the cross-bar to the lower pivot bracket and from there to the vehicle.

14. A vehicle seat comprising;

a seat cushion with an upper seating surface and a rear end;

a seat back with a forward facing seating surface extending upwardly from the rear end of the seat cushion, the seat cushion seating surface and the seat back seating surface intersecting at a bight line;

a mounting mechanism for attaching one of the seat cushion and seat back to a vehicle body; and a child safety seat attachment system having a cross-bar with two ends and extending laterally of the seat with at least one of the two ends of the cross-bar being coupled to the mounting mechanism, the cross-bar having a child safety seat anchorage attachment portion projecting through the bight line above the seat cushion seating surface for attachment of a child safety seat thereto to mount the child safety seat in a vehicle.

15. The vehicle seat as defined in claim 14 wherein the mounting mechanism attaches the seat back to the vehicle.

16. The vehicle seat as defined in claim 15 wherein the mounting mechanism is a hinge having a lower pivot bracket adapted to be fixed to the vehicle and an upper pivot bracket rotatably mounted to the lower pivot bracket about a pivot with the seat back coupled to the upper pivot bracket for rotation of the seat back with the upper pivot bracket about said pivot, the cross-bar being mounted to the lower pivot bracket whereby the child safety seat loads are transmitted from the cross-bar to the lower pivot bracket and from there to the vehicle.

17. The vehicle seat as defined in claim 16 wherein the cross-bar is rotatably mounted to the lower pivot bracket to rotate about a lateral axis whereby the anchorage attachment portion of the cross-bar is movable downward from a use position in which the anchorage attachment portion of the cross-bar is above the seat cushion seating surface to a stored position upon the seat cushion seating surface.

18. The vehicle seat as defined in claim 16 further comprising a bias mechanism operatively associated with the cross-bar and the lower pivot bracket to urge the cross-bar upward to the use position.

19. The vehicle seat as defined in claim 14 wherein the cross-bar is rotatably mounted to the mounting mechanism to rotate about a lateral axis whereby the anchorage attachment portion of the cross-bar is movable downward from a use position in which the anchorage attachment portion of the cross-bar is above the seat cushion seating surface to a stored position upon the seat cushion seating surface.

20. The vehicle seat as defined in claim 19 her comprising a bias mechanism operatively associated with the cross-bar and the mounting mechanism to urge the cross-bar upward to the use position.

21. The vehicle seat as defined in claim 19 further comprising a recess in the seat cushion seating surface located beneath the anchorage attachment portion of the cross-bar whereby the anchorage attachment portion of the cross-bar is below the seat cushion seating surface when in the stored position.

22. The vehicle seat as defined in claim 14 wherein a second end of the cross-bar is attached to the vehicle by a bracket.

23. The vehicle seat as defined in claim 14 further comprising a pair of mounting mechanisms on opposite sides of the seat with the ends of the cross-bar attached to each of the mounting mechanisms to attach the cross-bar to the vehicle.

24. The vehicle seat as defined in claim 14 wherein the mounting mechanism attaches the seat cushion to the vehicle.

25. The vehicle seat as defined in claim 24 wherein the mounting mechanism includes a fore and aft seat adjuster.

* * * * *